Aug. 18, 1931.  J. WILLIAMS  1,819,581

PISTON RING

Filed March 10, 1930

Inventor
John Williams.
By
Lacey & Lacey,
Attorneys

Patented Aug. 18, 1931

1,819,581

UNITED STATES PATENT OFFICE

JOHN WILLIAMS, OF PHILADELPHIA, PENNSYLVANIA

PISTON RING

Application filed March 10, 1930. Serial No. 434,715.

This invention relates to piston rings and has for an object to provide a piston ring which will positively prevent the cylinder being worn tapered as hitherto, so that the cylinder remains perfectly cylindrical throughout the life of the ring.

A further object is to provide a ring and spring tongues fabricated from the body of the ring whereby a strong durable integral unitary structure is produced.

A further object is to provide a piston ring having spring tongues adapted to exert a uniform downward pressure on the ring and coact with a novel tapered seat on the ring to centralize and steady the piston in the cylinder and positively prevent piston slapping and oil pumping.

A further object is to provide a piston ring which will permit of a lighter piston being used and also permit of the piston being machined less accurately.

A further object of the invention is to provide a piston ring having novel spring tongues adapted to hold the step cut in the ring against vertical displacement at all times.

A still further object is to provide a ring having spring tongues which have wiping contact throughout their outer edges with the walls of the cylinder and form oil grooves underneath them.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

Figure 1:
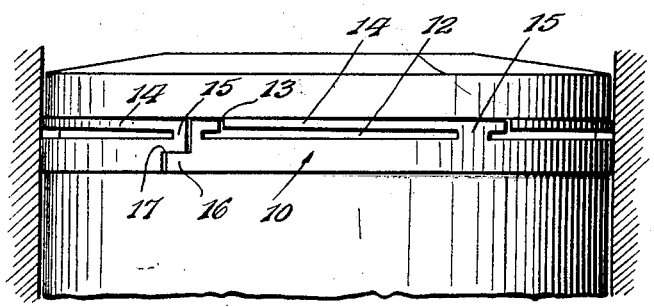
Figure 2:
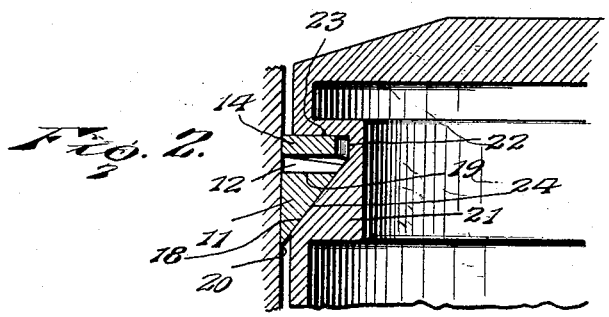
Figure 3:
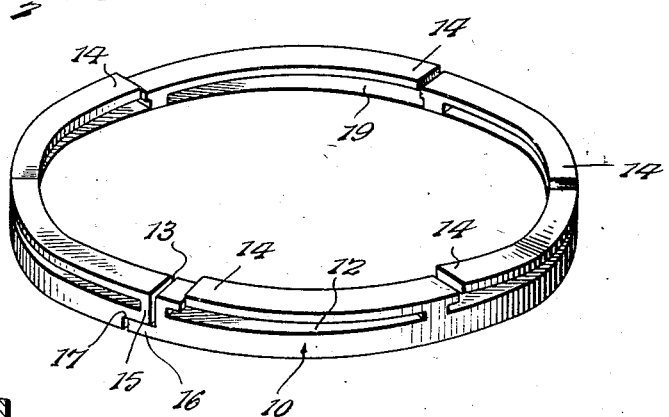
Figure 4:
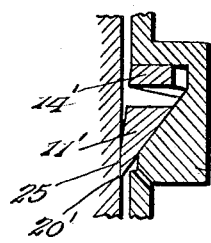

In the accompanying drawings forming part of this specification,

Figure 1 is a side elevation of a portion of a piston having thereon a piston ring constructed in accordance with my invention, Figure 2 is a fragmentary sectional view of a piston and ring embodying my improvements, Figure 3 is a perspective view of my improved ring, and Figure 4 is a fragmentary sectional view showing an oil ring constructed in accordance with my invention.

Referring now to the drawings in which like characters of reference designate similar parts, the piston ring is designated in general by the numeral 10. The ring is preferably formed of cast iron and includes a body portion 11 there being a series of horizontal slots 12 formed near the upper edge of the body portion. These slots are aligned and form oil grooves the purpose of which will presently appear.

Vertical slots 13 are cut through the upper edge of the ring and communicate with the slots 12 near the ends of the slots. By thus cutting the ring a plurality of tongues 14 are formed each tongue being connected near one end to the body of the ring by a web 15 and extending forwardly from the web at the free end and extending past the web at the fixed end. These tongues are in the present embodiment six in number, although any desired number of tongues may be formed.

The tongues 14, in one method of manufacture, are sprung outwardly by inserting wedges near the webs 15 and then heating the ring to set the tongues in this position. When cooling the tongues of the ring again become resilient in their new position and retain this resiliency throughout the life of the ring. However, it is to be understood that this particular method of manufacture is given merely as illustrative.

It will be pointed out that in a ring constructed as above described the tongues 14 and body 11 of the ring are in a single piece, that is, constitute a unitary integral structure. It will be observed that the outer edges of the tongues are flush with the outer edge of the body of the ring and the purpose of this construction is to produce wiping contact with the wall of the cylinder along the entire outer edge of each tongue as well as along the circumferential edge of the body of the ring.

In the present embodiment of my invention the ring is split as usual in piston ring construction and the split is illustrated as a step split including a tenon 16 and a recess 17 receiving the tenon. It will be observed that the web 15 of one of the resilient tongues 14 of the ring is disposed contiguous to the recess 17 that is, the secured end of the tongue overlies the recess. It will be further observed by following the tongues around the ring from the recessed to the tenon end, the free end of the last tongue of the series is disposed contiguous to the tenon 16.

The purpose of this construction is to maintain the step split against vertical displacement at all times and this is accomplished as follows. When the ring is seated in the piston groove as will be presently described, the tension of the tongue nearest the recess 17 will be exerted downward on the web 15 which overlies the recess and hold the recessed end of the ring pressed firmly down on the tenon end as will be obvious by referring to Figure 3 of the drawings.

It will be further observed that by virtue of the spring tongues 14 being formed by slotting the body of the ring circumferentially as above described oil grooves will be formed by the slots 12 underneath the tongues, communication with the oil grooves being established through the vertical slots 13.

Referring now to Figure 2 it will be seen that the inner lower edge of the body of the ring is beveled as shown at 18, the bevel extending at the upper end substantially to the bottom walls 19 of the slots 12 and at the lower end meeting the circumferential wall of the ring in a feather edge 20.

This construction is especially significant in that leakage of the explosion past the tongues will enter the slots 12 but will not enter back of the body of the ring so that the ring cannot be pushed outwardly by such leakage and cause wear on the cylinder. Ordinarily, due to the force of the explosion being greater at the top of the stroke the ring is pushed out to a considerably greater extent at the top of the stroke than at the bottom of the stroke, resulting in increased wear at the top of the stroke, or what is commonly called tapered wear of the cylinder wall. This occurs wherever piston rings have vertical inner walls against which the force of the explosion may be impinged and this construction is positively avoided in my present invention.

In Figure 2, the piston 21 is shown formed with a ring groove 22 having a horizontal top wall 23 and a beveled bottom wall 24, this construction being not new in piston grooves. However, it will be observed that by virtue of the tapered wall 24 of the ring groove extending substantially to the base edges of the resilient tongues 14, an annular space is presented above the body of the ring 10 to receive whatever leakage may occur and by virtue of the spring tongues holding the conical opposing surfaces, or in other words, the tapered walls 18 and 24 of the ring and piston groove in positive engagement, no leakage will be admitted back of the body of the ring to cause tapered wear on the cylinder as above described.

In operation, the top wall 23 of the piston groove causes compression of the free ends of the spring tongues 14, which pressure is transmitted through the webs 15 of the body of the ring and firmly seats the tapered face 18 of the ring upon the corresponding tapered face 24 of the ring groove in the piston. A component of this downward pressure will be exerted radially on the body 11 of the ring and operate to expand the ring and positively seal the combustion chamber without excessive wall pressure.

It will be furthermore observed that by virtue of the downward tension of the spring tongues being exerted on the body of the ring through the webs 15 spaced equally distant around the circumference of the ring, a substantially uniform pressure will be constantly maintained downwardly upon the ring to steady the piston in the cylinder and positively prevent piston slap and oil pumping.

It will be still further observed that the outer edges of the spring tongues being flush with the outer edge of the ring the tongues will establish wiping contact throughout their outer edges with the walls of the cylinder and by virtue of receiving the oil from the oil grooves 12 underneath them will also have oil wiping contact to prevent excessive wear on the cylinder wall.

While the compression rings are constructed substantially as above described it is preferable to taper the outer face of the oil ring 11' as best shown in Figure 4. The taper will begin at the upper edge of the body portion of the ring and extend downwardly to nearly the feather edge 20' of the ring whereby a substantially flat annular seat 25 will be disposed at the bottom edge of the ring for wiping contact with the wall of the cylinder. It is well known that no matter how accurately a ring is constructed if it starts to seat from the top oil will pass the ring. The taper or bevel above described on the outer axial face of the ring causes the ring to positively seat at the bottom first and prevent oil passing the ring.

Having thus described the invention, I claim:

1. A piston ring provided with circumferentially aligned horizontal slots and with vertical slots communicating with the horizontal slots in rear of the ends of the slots and opening through the upper edge of the ring, said slots, producing tongues connected to the body of the ring by webs, said tongues being sprung upwardly from the body of the ring at the free ends and extending past the webs at the opposite ends said ring being formed with a beveled seat extending substantially to the bottoms of the horizontal slots.

2. A piston ring comprising a body and horizontally curved resilient tongues struck from the body and forming an integral unitary structure therewith, there being a step split in said ring comprising a tenon and a recess, the secured end of one of said tongues overlying the recess of said step split and operating to hold said step split against vertical displacement.

3. A piston ring comprising a body, resilient horizontally extending compression tongues integral with the body and each connected to the body near one end by a web, the webs of the tongues being substantially spaced equi-distant apart around the body whereby the thrust of the tongues is distributed uniformly downwardly around the body, said body having a beveled lower face forming a seat below the tongues.

4. A piston ring comprising a body, resilient horizontal compression tongues struck from the body, there being aligned circumferential oil grooves between the upper edge of the body and the tongues, each tongue having a web spaced from both ends integral with said body, the free end of each tongue when relieved of tension being disposed above and rearwardly of the web of the adjoining tongue, said body having a beveled seat below the tongues.

5. A piston ring provided with horizontally curved tongues struck from the body of the ring and having the outer and inner axial faces beveled, the inner face forming a beveled seat for the ring and the outer beveled face producing an annular flat seat at the bottom of the ring for causing the ring to seat at the bottom first.

In testimony whereof I affix my signature.

JOHN WILLIAMS. [L. S.]